Aug. 18, 1953     H. K. HARTLINE ET AL     2,649,019
CONTRACTIBLE HEAD MOUNT FOR BINOCULARS
Filed Sept. 2, 1949     3 Sheets-Sheet 1

Aug. 18, 1953  H. K. HARTLINE ET AL  2,649,019
CONTRACTIBLE HEAD MOUNT FOR BINOCULARS
Filed Sept. 2, 1949  3 Sheets-Sheet 2
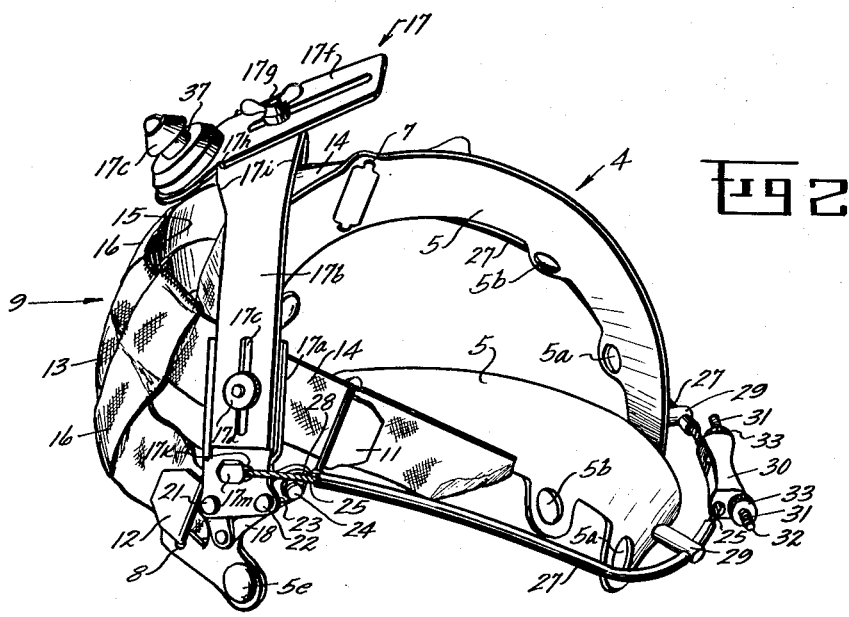
Fig 2.
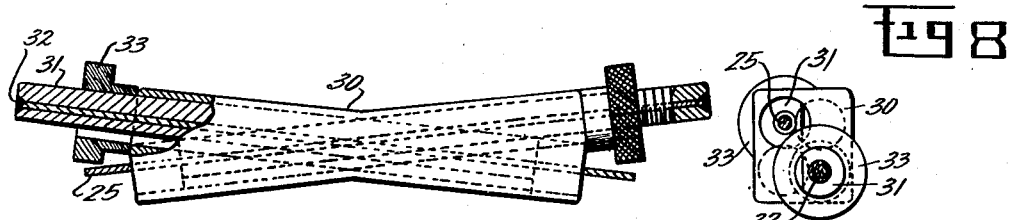
Fig 7.
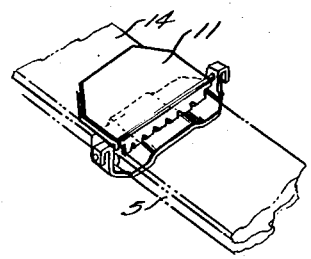
Fig 10.
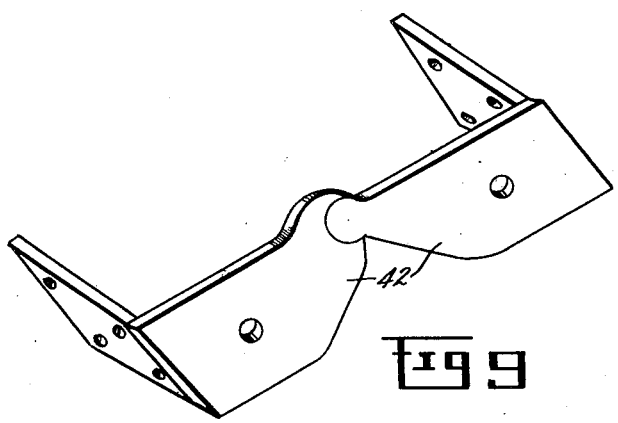
Fig 9.
INVENTORS.
H. K. HARTLINE
V. A. LEGALLAIS
BY A. J. RAWSON
Wade Koontz
Charles H Wagner
ATTORNEYS

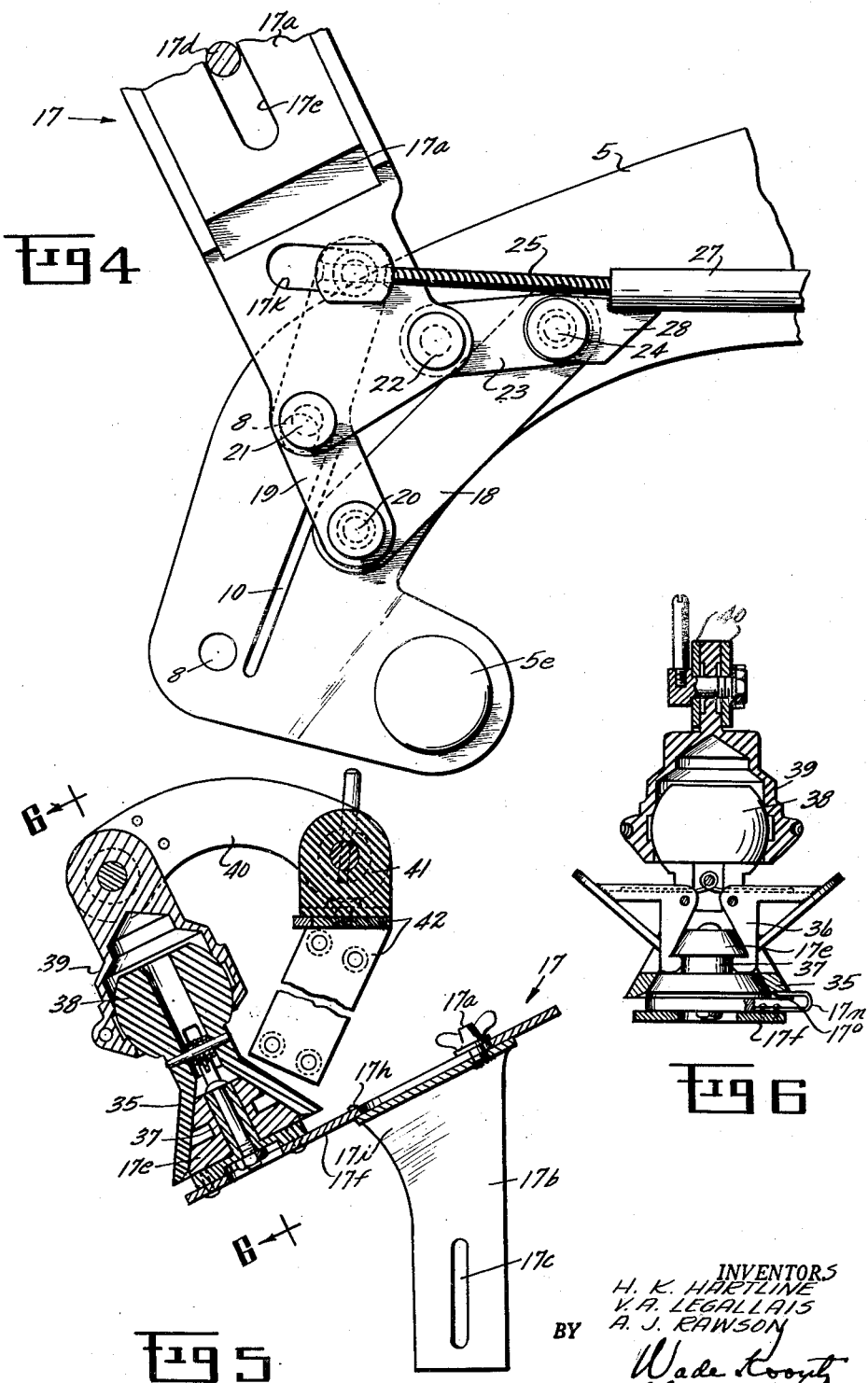

Patented Aug. 18, 1953

2,649,019

UNITED STATES PATENT OFFICE 2,649,019

CONTRACTIBLE HEAD MOUNT FOR BINOCULARS

Haldan K. Hartline, Media, Pa., Arthur J. Rawson, Frederick, Md., and Victor A. Legallais, Philadelphia, Pa., assignors to the United States of America as represented by the Secretary of the Air Force Application September 2, 1949, Serial No. 113,866

9 Claims. (Cl. 88—36)

1

The invention described herein may be manufactured and used by or for the Government for governmental purposes without payment to us of any royalty thereon.

This invention relates to article supporting means, and more particularly to contractible head mounts for binoculars or supporting means for aviator's head gear attachments, having for one of its objects the provision of an adjustable or contractible support shaped to fit a wearer's head or a head covering for the wearer, such as a combat helmet, having shiftable supporting means thereon for supporting an optical viewing attachment in an operative sighting position and in a nonoperative position, relative to the eyes or vision of the wearer.

It has been found desirable, and in fact necessary at times for aviators and operators of certain types of aircraft and vehicles to utilize special types of optical viewing and sighting attachments or similar devices, such as periscope types of binoculars, monoculars, and infrared telescopic binocular apparatus, especially where the normal visibility is obscured or impaired, in order to obtain an improved, and even a magnified vision. In order to leave the aviator's or operator's hands free to manipulate the necessary controls or other apparatus of the aircraft or vehicle under these conditions, and to also provide complete freedom of movement or adjustment of the operator's position within the vehicle, it is desirable to mount the optical viewing devices or attachments in firmly supported positions directly on the wearer's person, preferably on the operator's head gear or protecting helmet, so that the same can be accurately supported in a predetermined sighting position relative to the operator's field of vision at all times, preferably to include, however, means for quickly and accurately shifting the viewing devices or attachments between the operative sighting position in front of the operator's eyes and a nonoperative position out of the operator's vision where it can be instantly and easily shifted by the operator to the aforesaid sighting position, and further, to provide separable securing and adjusting means for quickly releasing and removing the optical sighting or viewing devices from the support when they are no longer required, or accurately and quickly mounting the sighting devices on the support when operating conditions again make their use desirable or necessary.

A still further object of our invention is the provision of contractible head encircling supporting means having relatively movable attachment supporting means thereon, shiftable to operative or nonoperative positions for respectively contracting or slacking the contractible head encircling support on the wearer's head or head covering, and coupling means on the attachment supporting means for centering and orienting an optical sighting device thereon such as an infrared binocular or telescope which is adjustable with the attachment supporting means between the operative viewing position and the nonoperative position out of the wearer's vision.

A further object is the provision of a contractible support which is bendable to fit the head of a wearer, having a swingable attachment supporting means thereon for supporting an optical viewing attachment such as an infrared binocular telescope or periscope including separable connecting means between the optical viewing means and a swingable attachment supporting means for centering, orienting, and rigidly supporting the optical viewing attachment on the support in a predetermined operative sighting position relative to the eyes of the wearer, in which the attachment supporting means and attachment are swingable to a nonoperative position out of the wearer's vision, the attachment supporting means being pivoted on the contractible supporting means, and the contractible supporting means encircling the head of the wearer and being contractible by the swinging movement of the attachment supporting means to firmly secure the contractible support on the wearer's head in a predetermined oriented position when the optical viewing means is in the operative sighting position.

A further object is the provision of head encircling and clamping means operatively connected to the swingable attachment supporting means and carried by the contractible support, including tightening means for tensioning the head encircling means about the head of the wearer when the swingable attachment supporting means is moved to operative position, and relieving the tightening tension of the head encircling and clamping means on the wearer's head when the swingable attachment supporting means is moved rearwardly to the nonoperative position.

A still further object of our invention is the provision of a combined separable head fitting support and an optical viewing attachment for aviators, including swingable means for supporting the attachment, and contractible head clamping means movable on the head fitting support by the swinging movement of the swingable attachment supporting means to contract the head fitting support about the head of the wearer when the attachment supporting means is swung forwardly to position the optical viewing attachment in a predetermined sighting position relative to the eyes of the wearer, and to relieve the clamping tension on the wearer's head when the attachment supporting means is swung rearwardly from the operative position to the nonoperative position to dispose the attachment out of the wearer's vision.

Other objects and advantages of our invention will become apparent from the following description, taken in connection with the accompanying drawings, in which like reference characters refer to like parts in the several figures.

Fig. 2 is an enlarged perspective view of the contractible head mount for binoculars showing the bail member in its nonoperative position with the optical viewing attachment removed.

Fig. 3 is an enlarged fragmentary elevation of the forward portions of the side plates and bail member showing the same in nonoperative position.

Fig. 4 is a view similar to Fig. 3 but showing the bail member swung forwardly to its operative position.

Fig. 5 is an enlarged vertical sectional view through the bail member showing the detachable securing means for the binocular attachment support in section.

Fig. 6 is a transverse sectional view taken approximately on the plane indicated by line 6—6 in Fig. 5.

Fig. 7 is an enlarged fragmentary detail view, partly in section, of the adjustment means for the contracting cable.

Fig. 8 is an end view of the construction shown in Fig. 7.

Fig. 9 is a detail perspective view of the two interlocking pivot plates on which the viewing monoculars are mounted; and Fig. 10 is a detail view of the adjustment means for the head encircling strap or band.

Figure 1:
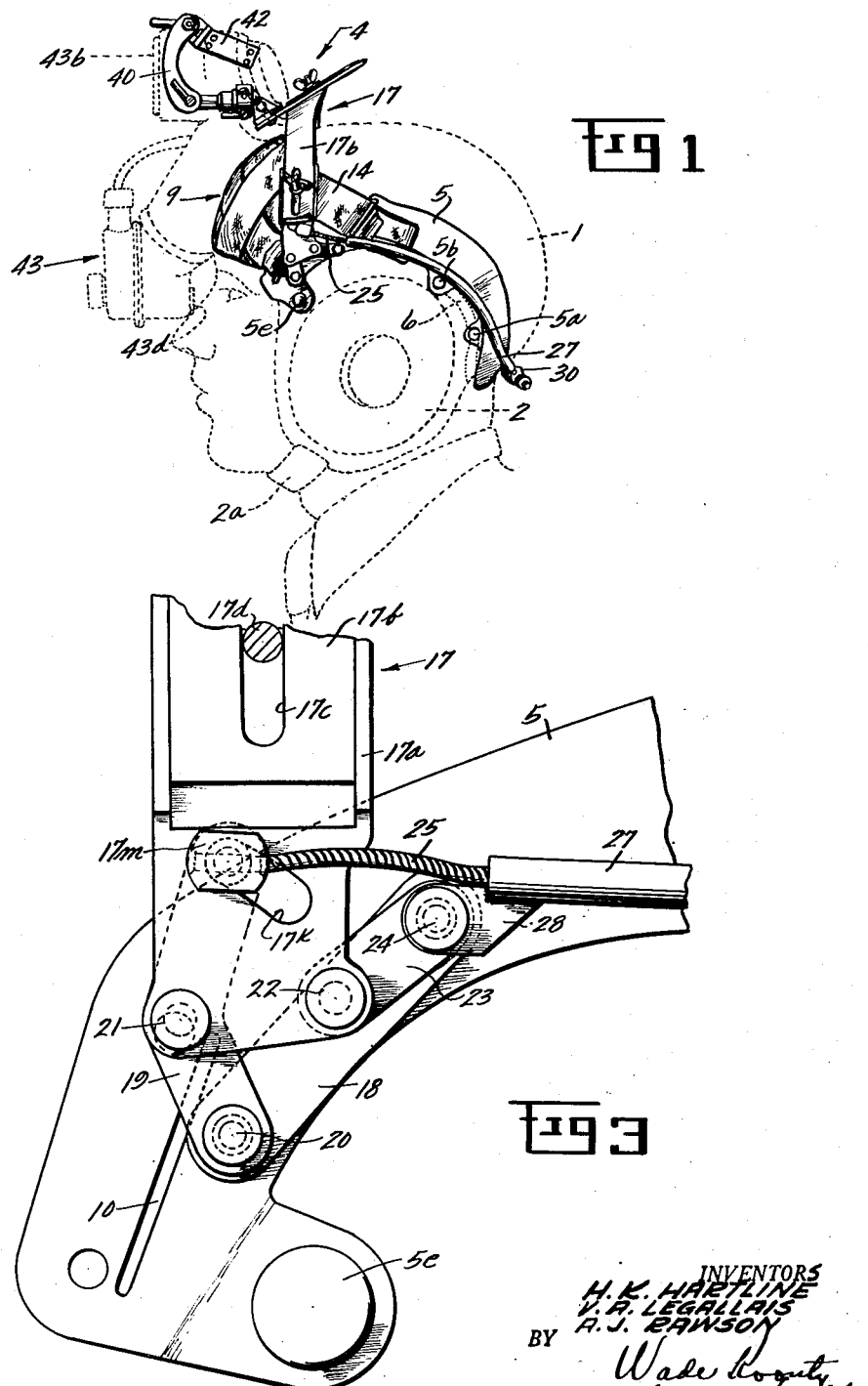
Fig. 1 is a side elevation of our improved contractible head mount for binoculars showing the same in position on the head of a pilot. The pilot and the optical viewing attachment being shown in dotted lines with the attachment shown in its operative position.

Referring to the drawings, the reference numeral 1 indicates generally a head covering for an aviator or vehicle operator, such as an aviator's flying helmet of the type using large rubber "doughnut-shaped" earphone holders 2. It is important that the head covering or helmet fits the wearer's head snugly and well, and preferably is held in place by a chin strap 2a.

Our optical viewing attachment support or light weight harness device is indicated generally at 4 and is preferably secured to the helmet 1 at a plurality of points, the harness being designed to be loose and unobtrusive to the wearer when a viewing attachment such as a "Z binocular" or infrared type of periscope monocular or binocular device 43 is not attached thereto, so that the harness can be worn for long periods of time without discomfort.

The attachment support 4 comprises a pair of elongated plate members 5—5 formed of thin flexible resilient sheet material, curved and bendable to fit and extend longitudinally around the opposite sides of the pilot or wearer's head, and the helmet 1, as shown in the drawings, extending from points adjacent the temples, curving around the upper portions of the earphone elements 2 and then downwardly toward each other, terminating in spaced relation at the base of the wearer's head or nape of the neck. A pair of apertured retaining ears or eyes 5a and 5b project from the lower edge of each of the side plates 5, the lower ears 5a each receiving a retaining strap 6 therethrough, the straps 6 being secured to the helmet 1 rearwardly of the earphones 2 and extending through apertures 5a and then forwardly with their ends detachably secured to snap fastener elements fixed on the helmet and projecting through the other ears 5b, and snapped into the complemental snap fastener members located on the ends of the straps 6, thus securing the attachment support to the helement at the lower sides thereof, intermediate the ends of the side plates 5. Each of the side plates 5—5 has two pairs of vertically spaced openings 7—7 and 8—8 therethrough to which a wide flexible webbing or head band 9 is anchored. The side plates 5 each have a vertical slot 10 therethrough at their forward ends just rearwardly of the vertical holes 7—7. Upper and lower buckles or strap clamping members 11 and 12 are secured in the openings 7—7 and 8—8 to provide means for the adjustment and connection between the flexible head band 9 and the side plates 5.

The head band 9 comprises a flexible web or strap element 13 with each of its end portions 14 looped through one of the slots 10, the end portions 14 inclining upwardly across each other and adjustably secured to the side plates 5 by the clamp members 11. The lower clamp members or buckles 12 provide adjustment means for the length between the looped portions 14 of the straps while the upper buckles or clamps 11 provide adjustment for the length of the crossed strap portions. A soft, cup-shaped pad member 15, preferably made of leather, is disposed behind the strap members 13 and 14 and is provided with a plurality of vertical retainer straps or loops 16 stitched thereto, for receiving and retaining the strap 13 and portions 14 in the predetermined desired positions across the pad member 15.

The two curved side plates 5—5 have a bail member pivotally secured thereto, and indicated generally at 17, the mounting means for the bail member comprising a toggle supporting base plate 18 secured at its opposite ends to the forward portions of the side plates 5 as shown in the drawings. An angle lever 19 is pivoted at 20 to each of the toggle base plates 18, the angle levers 19 extending upwardly between the bail member 17 and the side plates 5. The angle levers 19 each have an aperture therethrough located intermediate their ends, receiving the pivots 21, to which the ends of the bails 17 are attached. The pivots 21 between the bail 17 and the angle levers 19 pivotally secure the ends of the bail to the side plates near one edge of the bail. The bail 17 has a second aperture formed therein at each of its ends adjacent the other edge and the aperture for the pivot 21, receiving a pivot 22 for a toggle link 23. The toggle links 23 are pivoted at their other ends to the base plates 18 at 24 and, of course, to the side plate 5 at 24.

The bail member is adjustable in length, and comprises a pair of channeled end plates 17a formed at their ends with aforesaid apertures for receiving the respective pivots 21 and 22 for the angle levers 19 and the toggle links 23. A U-shaped article supporting plate or bar member 17b is adjustably secured in the channeled ends of the pivot plates 17a, having a slot 17c formed therein, receiving a clamping bolt 17d which provides adjustment and securing means for the portion 17b of the bail member 17. An article attaching support in the form of a conical member 17e is fixed on the end portion of an elongated slotted plate 17f, held in position on the U-shaped member 17b by a clamping bolt 17g. The slotted plate 17f is retained in position against rotation about the clamp bolt 17i by the interengagement of lip members 17h therewith projecting from the opposite edges of the widened portion 17i of the bail member 17, thus providing an adjustment for varying the distance between the article supporting cone member 17e and the center line of the U-shaped bail member 17b.

The channel end plates 17a of the bail are each formed with an arcuate slot 17k, the free ends of the angle levers 19 each carrying a stud or cable anchor pin 17m thereon extending through the arcuate slot 17k, the ends of a pair of contracting or tensioning cables 25 being secured thereto. Each of the side plates 5 carries a tubular cable guide or conduit 27, secured at its forward end to the pivot 24 for the toggle link 23 by an end or anchor plate 28 secured to the conduit 27. The rear end portions of the cable conduits are secured adjacent the rear ends of the plates 5 by anchor posts 29 extending outwardly from the rear ends of the side plates. The two cables 25 thus extend around the rear ends of the side plates 5 and cross each other, a cable anchor or abutment block 30 being provided between the adjacent ends of the cable guide tubes 27, the block being formed with crossed guide channels extending longitudinally therethrough to receive a pair of threaded sleeves 31 with their adjacent sides flattened, smooth, and in sliding contact with each other. The free ends of the cables 25 pass through the sleeves 31 as shown, and are secured against withdrawal from the sleeves by knotting or soldering the ends of the cables as indicated at 32. An adjustment nut 33 is threaded onto each sleeve member 31 and abuts the ends of the block 30 when tension is applied to the cables, thus tending to contract the free or rear ends of the side plates 5 inwardly toward each other, the side plates 5 extending rearwardly and downwardly beyond the anchor posts 29, forming resilient flexible extensions projecting toward each other in front of the abutment block 30.

The above harness or article supporting means is shaped to fit the head covering or helmet of the wearer, with the head plates 5 curved in around the opposite sides of the head above the ears. The pad 15 and the straps 13—14 flexibly connect the forward ends of the side plates 5 together, forming a somewhat cup-shaped pad across the forehead above the eyes. A snap fastener is preferably provided on the tabs 5e at the forward ends of each of the side plates 5 to receive a complemental snap fastener element which is fixed on the helmet, to positively anchor the forward portion of the harness to the helmet at the two spaced points.

When the attachment supporting bail member 17 is swung rearwardly on the angle levers 19, about the pivots 21 and around the pivots 20 for the angle levers, the pivots 22 on the ends of the bail displace the forward ends of the toggle levers 23 downwardly, collapsing the toggles. This action swings the upper ends of the angle levers and the cable anchor studs 17m to which the contracting cables 25 are connected, rearwardly in the arcuate slots 17k and toward the anchored ends of the cable guide tubes 27, thus slacking the contracting cables 25 as the bail member 17 is swung rearwardly, its rearward swinging movement being limited by the ends of the arcuate slots 17k. When moved rearwardly the article supporting means 17e is also shifted rearwardly above the head of the wearer to nonoperative position shifting the weight of the article carried by the cone member 17e rearwardly above the head, as shown somewhat diagrammatically in the drawings. Since the contracting action on the cable 25 and on the side plates 5 is relieved, due to the collapsing of the toggle links 23, the clamping pressure around the head of the wearer is also relieved, making the helmet more comfortable to wear.

When the bail member is swung forwardly, from the nonoperative position just mentioned to the operative position, the bail swings on the pivots 21 on the angle levers 19, moving the other pivots 22 upwardly to swing the lower ends of the toggle links 23 upwardly. This action swings the free ends of the angle levers forwardly to move the cable anchor studs 17m forwardly relative to the cable tube end anchor means 28, thus contracting the cable 25 around the head of the wearer, contracting the rear ends of the plates 5 toward each other and tensioning them to draw or contract the cupped pad member 15 and the side plates 5 into tighter supporting engagement about the wearer's head or the helmet, as the case may be, the supporting cone 27e also moving forwardly and downwardly above the wearer's head to the predetermined operative supporting position where the cable anchor studs 17m abut the other ends of the slots 17k in the end plates 17a of the bail member 17.

In mounting the optical viewing device or attachment on the bail member carried cone 17e we attach to the optical viewing device, preferably, a funnel-shaped guide member 35 which is easily slipped over the tapered end of the cone 17e, the tapered guide member 35 having a complemental tapered surface fitting the cone 17e to securely position the guide member on the cone and prevent any lateral movement or side play. A pair of spring operated, manually releasable, latch members 36 are pivoted at the opposite sides of the guide tube 35, extending through slots formed in the guide tube into latching engagement with an annular shoulder 37 formed around the cone 17e. The upper portion of the guide tube 35 is formed with a ball-shaped extremity 38 adjustably clamped in a ball-shaped socket member 39, having a flattened integral extremity adjustably pivoted between two curved supporting plates 40. The T cap-shaped bracket 41 is adjustably clamped between the opposite ends of the curved plates 40, a pair of adjustable interlocking flat plates 42 being pivoted thereon with interengaging ends, so that adjustment of one of the plates 42 about its pivot in one direction correspondingly adjusts the other plate 42 about its pivot on the tube-shaped supporting bracket 41 in the opposite direction. Suitable clamping means are provided between the plates 42 and the bracket 41 so that when the plates 42 are adjusted relative to the funnel-shaped guide tube 35, the clamping means can be tightened to rigidly support the plates 42 against relative movement to each other, and to the funnel member 35. An optical viewing device such as the Z monocular or infrared periscope device is rigidly attached to each of the flat plates 42, as shown in the drawings in dotted lines at 43. The two infrared monoculars 43, when taken together and properly adjusted constitute a binocular attachment having sighting eyepieces or oculars 43a and field viewing lenses or objectives 43b.

When the harness 4 and helmet 1 have been properly fitted and adjusted to the head of the wearer, and the bail member 17 swung forwardly to the operative position, and the Z binocular viewing attachment 43 has been properly adjusted and latched in position on the cone member 17e on the bail member 17, the eye pieces or oculars 43a of the viewing attachment will be disposed directly in front of the wearer's eyes so that by looking directly forward he can sight through the two monoculars and obtain a clear, or even a magnified, stereoscopic vision. When goggles are used the oculars or eyepieces of the binoculars will be disposed, when the bail 17 is moved forward to operative position, centered in front of the lenses of the goggles near the top edges thereof, permitting the operator to look directly ahead through the binoculars, or under the oculars for the closer or near vision. The outer or objective ends of the viewing apertures of the binoculars are located somewhat above the eyepieces and facing forwardly, raising the line of sight actually somewhat above the eyes of the wearer. In this operative position of the bail member 17 with the binoculars supported thereby, the toggle links contract and tension the cable 25 around the sides and the rear end of the base of the helmet, and of course, around the head of the wearer, contracting the enclosing portion of the side plates and head band to firmly support the binocular device in its operative sighting position.

When the binocular device is no longer required the wearer simply grasps the same and pushes it upwardly and rearwardly out of the way, shifting the weight of the binoculars rearwardly and above the helmet. The bail member swinging rearwardly with the binoculars to the nonoperative out-of-the-way position causes the toggle means to collapse, thus relieving the clamping or contracting action of the cable on the plates about the wearer's head, making the harness more comfortable to the wearer. By grasping the binoculars and pulling forwardly and downwardly they are instantly carried into operative sighting position and the contracting cable is simultaneously tightened to prevent slipping or accidental displacement of the helmet or harness, which displacement would, of course, displace the position of the sighting object eyepieces of the viewing attachment.

A leaf spring 17n, as shown in Fig. 6, is carried by the adjusting plate 17f which carries the cone 17e, the leaf spring 17n engaging a notch 17o formed in the bottom of the funnel-shaped guide tube 35, preventing rotative adjustment or displacement of the guide tube 35 about the axis of the cone 17e. By grasping the handle portions of the two latch members 37 and pushing inwardly, the latches are withdrawn from the engagement with a shoulder or the channel 37 in the cone member 17e and the optical viewing device can be disengaged and lifted off of the cone and stowed away until further use of the official sighting device is desirable or necessary.

Having thus described our invention what we claim is new and desire to secure by Letters Patent is:

1. In combination with a flexible head covering adapted to snugly fit the head of a wearer, a pair of elongated flexible plate members curved and shaped longitudinally and laterally to fit the opposite sides of the head covering and extending forwardly and rearwardly at opposite sides of the head when the head covering is worn by the wearer, a flexible head band member connected between the forward ends of the plates and shaped to fit the forward upper portion of the head covering and the head of the wearer, an optical viewing attachment supporting bail member pivotally connected at its opposite ends to the forward end portions of each of the plate members to swing between a forwardly extending operative and upwardly extending nonoperative position above the plate members, a flexible contracting loop element extending around the rear end portions of the plate members, contracting means for contracting the loop element connected between the bail member and the loop element, operable by the bail member to contract the loop elements about the rear ends and side portions of the plate members toward the head covering by swinging movement of the bail member forwardly to the operative position, and slack the loop element by swinging movement of the bail member rearwardly from the operative position toward its nonoperative position, means connected between the plate members and the loop element for transferring the contracting action of the loop element to the plate members to contract and tension the plate members around the head covering to contract and firmly secure the head covering on the head of the wearer when the bail member is moved to the operative position, and viewing attachment mounting means fixed to the bail member intermediate its ends for mounting an optical viewing attachment on the bail member, whereby said attachment is shiftable therewith to an operative viewing position forwardly of plate members and the head covering by movement of the bail member toward operative position and is moved by the bail member to a nonoperative position out of the wearer's vision by movement of the bail member toward the nonoperative position.

2. An optical viewing attachment support shaped to fit the head of a wearer, said support comprising a pair of elongated flexible side plate members curved to fit the upper side portions of the head of the wearer, a relatively wide flexible head strap member connecting the forward end portions of the side plates together adapted to lie across the upper front portion of the wearer's head, an attachment supporting bail member pivotally connected at its opposite ends to the forward portions of the side plate members, a flexible cable loop element extending around the rear end portions of the plate members and then extending forwardly adjacent the sides of the plate members, cable actuating toggle means operatively connected between the end portions of the loop element and the side plate members and actuated by the bail member to contract the loop element toward the rear end portions of the side plate members when the bail member is swung forwardly above the side plate members, to a predetermined operative position and slacking the loop element when the bail member is swung rearwardly from the operative position to a predetermined nonoperative position above the side plate members, connecting means between the rear end portions of the side plate members and the loop element for contracting the side plate members and the flexible head strap member about the head of the wearer when the loop element is contracted, to firmly contract the viewing attachment support about the head of the wearer when the bail member is swung forwardly to the operative position, and connecting means for fixedly mounting an optical viewing attachment on the bail member to dispose the viewing attachment in an operative position relative to the eyes of the wearer when the bail member is swung forwardly to its operative position.

3. In a portable support for optical viewing attachments such as an infrared binocular, contractible supporting means adapted to fit and surround the upper portion of the head of the wearer, a swingable attachment support pivoted to said contractible supporting means to swing forwardly and rearwardly to predetermined operative and nonoperative positions above the contractible supporting means and above the wearer's head, cable means extending around the sides and rear portions of the contractible supporting means and connected to the rear end portions of the contractible supporting means, cable contracting toggle means operable between the swingable attachment support and the cable means to tension the cable means to contract the contractible supporting means incident to forward swinging movement of the swingable attachment support to the predetermined operative position, and operable to slack the cable means to relieve the contracting action by swinging movement of the swingable attachment support rearwardly to the nonoperative position, means for adjusting the effective length of the cable means independently of the toggle means to adjust the effective contracting action of the contractible supporting means, when positioned on the head of the wearer, and an optical viewing attachment, such as a binocular, detachably and rigidly mounted on the swingable attachment support, movable with the attachment support to a predetermined operative viewing position in the vision of the wearer by swinging movement of the attachment support forwardly to the operative position, and shiftable upwardly out of the wearer's vision by swinging movement of the attachment support rearwardly from the operative position to the nonoperative position.

4. Apparatus as claimed in claim 2 including means positioned intermediate the ends of the attachment supporting bail member and the side plate members for adjusting the effective length of the bail member between its pivotal connections on the side plate members to adjust the vertical position of the optical viewing attachment when the same is mounted on the attachment supporting bail member while the bail member is in its operative position.

5. In a portable support for optical viewing attachments, such as an infrared binoculars, flexible contractible supporting means shaped to fit the head of a wearer comprising a pair of thin curved plates shaped to fit the sides of the upper portion of the wearer's head, a flexible cup-shaped pad member shaped to fit the forehead of the wearer, adjustable strap means connected to the pad member, means adjustably connecting the strap means to the forward ends of the flexible side plates, a pair of levers each pivoted at one end to one of the resilient plates to swing forwardly and rearwardly in a substantially vertical plane, a contracting cable looped around the rear ends of the flexible side plates, means connecting the free ends of the contracting cable to the free ends of the pivoted levers, a bail member extending transversely above the flexible plates and pivoted at each end to one of the levers intermediate the ends of the lever, a pair of toggle links each pivotally connected to the bail member adjacent the pivotal connections at the ends of the bail member to the levers, and pivoted at their opposite ends to the flexible plates, a pair of cable guide tubes slidably receiving and surrounding the contracting cable, means connecting one end of each tube to each of the flexible plates adjacent the pivotal connections of the toggle levers thereto said cable guide tubes extending rearwardly in substantially parallel relation to the side plates and terminating in spaced relation to each other adjacent the rear ends of the side plates, connecting means between the cable guide tubes and the resilient plates for supporting the cable guide tubes in substantially uniformly spaced fixed relation to the side plates, stop means between the bail member and the pivoted lever limiting the forward and rearward swinging movements of the bail member above the plates betwen a predetermined relatively forward operative position and a predetermined relatively rearward nonoperative position, an optical viewing attachment, means for detachably connecting the optical viewing attachment to the bail member and rigidly supporting same on the bail member in an operative viewing position relative to the eyes of the wearer of the portable support when the bail member is swung forwardly to the operative position.

6. Apparatus as claimed in claim 5 including means intermediate the ends of the contracting cable and located between the rear ends of the cable guide tubes for adjusting the effective length of the contracting cable between the rear ends of the cable guide tubes, to adjust the length of the contracting loop between its connections to the free ends of the pivoted levers.

7. Apparatus as claimed in claim 5 in which the bail member is formed with arcuate slots adjacent its ends, each slot having a radius with its center located concentrically to the pivotal axis of the bail member on the pivoted lever, and the radius equal to the distance between the bail member pivot on the pivoted lever and the center of the connection of the contracting cable to the pivoted lever, and abutment means on the cable connection engageable with the ends of the arcuate slots limiting the relative swing of the bail member to the pivoted lever, between the said operative and nonoperative positions, said contracting cable means being connected to the abutment means outwardly of the bail member.

8. In an optical viewing attachment supporting device of the class described, contractible supporting means shaped to fit the head of a wearer, swingable optical viewing attachment supporting means pivotally mounted on the contractible supporting means to swing forwardly and rearwardly thereon between predetermined operative and nonoperative optical viewing attachment supporting positions above the contractible supporting means, and above the head of the wearer when the contractible supporting means is fitted on the wearer's head, contracting means operably connected between the attachment supporting means and the contractible supporting means for contracting the contractible supporting means, operable by swinging movement of the swingable supporting means to contract the contractible supporting means on the wearer's head incident to forward swinging movement of the swingable supporting means to its operative supporting position, and operable by swinging movement of the swingable supporting means from the operative position toward its nonoperative position to relieve the contracting action, and mounting means fixed on the swingable optical viewing attachment supporting means for rigidly mounting an optical viewing attachment thereon in operative viewing position for the wearer when the swingable supporting means is in the operative position, and shiftable with the swingable supporting means to the nonoperative position to support the optical viewing attachment out of the wearer's field of vision.

9. In a supporting device adapted to fit a head of the wearer, for rigidly supporting optical viewing apparatus such as an infrared periscope binocular in an operative viewing position in the wearer's field of vision and in a nonoperative position out of the wearer's field of vision, a contractible support shaped to fit the head of the wearer, optical viewing apparatus supporting means pivotally mounted on the contractible support to swing forwardly and rearwardly above the contractible support, respectively between said operative and nonoperative positions, toggle actuated contracting means operatively connected between said contractible support and the viewing apparatus supporting means, operable to contract the contractible support by swinging movement of the pivotally mounted supporting means forwardly to operative position, and operable by the pivotally mounted supporting means to relieve the contracting action on the contractible supporting means by swinging movement of the pivotally mounted viewing apparatus supporting means rearwardly from the operative position toward nonoperative position.

HALDAN K. HARTLINE.
ARTHUR J. RAWSON.
VICTOR A. LEGALLAIS.

References Cited in the file of this patent

UNITED STATES PATENTS

| Number | Name | Date |
|---|---|---|
| 1,133,056 | Pachner | Mar. 23, 1915 |
| 1,605,725 | Herbert | Nov. 2, 1926 |
| 1,841,054 | Powers | Jan. 12, 1932 |
| 2,187,542 | Hagen | Jan. 16, 1940 |
| 2,301,050 | Kelley | Nov. 3, 1942 |